United States Patent [19]

Sawby

[11] 4,214,555
[45] Jul. 29, 1980

[54] CATTLE VISE

[76] Inventor: Ken Sawby, P.O. Box 520, Maple Creek, Saskatchewan, Canada

[21] Appl. No.: 896,284

[22] Filed: Apr. 14, 1978

[30] Foreign Application Priority Data

Feb. 1, 1978 [CA] Canada .................................. 614867

[51] Int. Cl.² ............................................ A61D 3/00
[52] U.S. Cl. ..................................................... 119/103
[58] Field of Search .................................. 119/103, 99

[56] References Cited

U.S. PATENT DOCUMENTS

| 425,478 | 4/1890 | Webster | 119/99 |
|---|---|---|---|
| 2,000,122 | 5/1935 | Cameron | 119/103 |
| 2,737,153 | 3/1956 | Dupont et al. | 119/103 |
| 3,187,378 | 6/1965 | Sauvage | 119/99 |
| 3,777,715 | 12/1973 | Hill et al. | 119/99 |

*Primary Examiner*—Hugh R. Chamblee

*Attorney, Agent, or Firm*—Burns, Doane, Swecker & Mathis

[57] ABSTRACT

The invention is a portable cattle restraining apparatus useful in the procedure for trimming an animal's hoofs, while maintaining it docile. The apparatus clamps the animal in a manner which imparts lifting force, while at the same time restraining it from movement. The frame which houses the clamp rotates so as to tilt the animal sideways, and the completely open bottom of the frame affords unrestricted access to the hoofs of the animal. The entire frame rests on the ground for maximum stability, but is converted into a trailer by rotation of a jackshaft, thus placing the wheels of the trailer on the ground and raising the frame for transport. The structure allows a cattle rancher to perform his own hoof trimming operations rather than summoning a specialist.

11 Claims, 6 Drawing Figures

CATTLE VISE

This invention is directed to an animal enclosure for closely holding an animal, and is particularly useful to the cattle rancher as an aid while trimming the hoofs of cattle.

Cattlemen find it necessary to trim the hoofs of their cattle periodically to help maintain them against the likelihood of splitting or of otherwise becoming diseased or disfigured. The procedure of restraining the animal prior to the procedure of performing the necessary operations on its hoofs is generally not an easy task; indeed, the task of managing the animal is time consuming and considerably more difficult than the actual hoof trimming.

In the past, a veterinarian or professional hoof trimmer having specialized apparatus and training had been used frequently to perform the actual hoof trimming. Specialized apparatus had been used to restrain the animal; sometimes such apparatus involved the use of belly straps for supporting the underside of the animal, and the animal was then lifted on a bed board to a postion for relatively easy access to its hoofs, or to its underside for verterinary operations.

It has been found that the use of belly straps sometimes causes injury to the animal and consequently this is often considered to be an undesirable structure, even for use by the relatively skilled and experienced rancher or cattle worker. Accordingly cattle are often given general anesthetics to render them unconscious and therefore safe to trim.

Other prior art structures utilize vertical or near vertical panels between which the animal is driven. The panels are then caused to close toward each other, thus restraining the animal therebetween. Doors in parts of the panels are subsequently opened, allowing an operation to be performed at particular locations on the body of the animal.

In one structure as described in Canadian Pat. No. 614,867, issued Feb. 21, 1961 to John O. Emmelkamp, a pair of clamping memebers are shaped to generally fit the outside of the animal's body. With the animal driven between them, the clamping members are caused to close toward each other, securely holding the animal therebetween. A series of pulleys under the floor of the structure and above the top of the structure operated by cranks cause the clamping members to close toward each other so as to hold the animal.

The entire frame can be rotated about a rod to which it is journaled at both ends, the rod being supported by a pair of posts.

While the structure described in the aforenoted patent functions to restrain the animal, the structure is not suitable for use by the unskilled cattle worker, for engaging a large number of different sized animals of varying temperament, which worker must work in a mobile manner. For example, the cattle must be driven up a ramp in order to become positioned within the clamping members. This can be fearful for the animal, destroying its docility. The floor of the structure on which the animal stands rotates with the frame, and there is no, or little access to the hoofs of the animal. Should the floor be removed prior to rotation the rotational movement of the structure would cause the animal to sense that the ground were moving under it since there is no provision for raising the animal prior to rotating it. Accordingly the sense of balance of the animal would be lost and it would become agitated. In addition, the sideways relative movement could cause injury to the legs of the animal.

The structure further does not lend itself to portable transport to the location of the cattle; the cattle must be rounded up and brought to the location of the structure, since special stability pads are used for a fixed structure.

In summary, the aforenoted structure is particularilly designed to facilitate veterinary operations on the sides and front or rear of the animal, but is very unsuitable for use as a mobile hoof-trimming instrument.

The present invention, however, is particularily directed to a portable cattle restraining apparatus for use in trimming hoofs. The structure utilizes the earth and a small foot plate at approximately earth level at the front as a floor, thus allowing cattle to be driven into it with security and minimum fear. Means is provided for clamping the animal within the structure while imparting an upward force, thus removing weight from the legs of the animal, and further means allows the animal to be rotated to an approximately horizontal position whereupon the hoof trimming operation can be done.

The animal steps on the front foot plate with its front hoofs, once it is held in a standing position, and is thus restrained from being able to lift the machine, since it is attempting to lift its position, and own weight on the foot plate. The foot plate thus provides additional stability to the structure.

A neck clamp is positioned to hold the neck of the animal in an off-center location to restrain it in a comfortable rest position while lying on its side, and a headrest is provided for allowing the head of the animal to lie in an unstrained position with its horns fully accommodated.

Further, a jackshaft extends across the structure, at the ends of which are mounted a pair of wheels. Thus the entire structure can be raised and supported by the wheels when the jackshaft is rotated. In this configuration, the structure can be pulled by a drawbar attached to the front, as a trailer. With the jackshaft lowered, however, the base of the structure rests and is supported securely by the ground while the animal is within the structure either in its vertical or horizontal configuration.

Virtually the entire bottom of the cattle-restraining mechanism which rotates is open, allowing complete access to the hoofs of the held animal. Accordingly the hoofs can be trimmed while extending sideways with the operator in a comfortable position and with the animal fully restrained and supported. Yet because the animal is restrained sideways and at the front, while the weight is removed from his hoofs to a large extent, its efforts to kick or jump are unrewarded as it cannot exert its weight against a stable fulcrum (earth) position. Accordingly there is substantially improved safety afforded the operator. An easier and faster hoof-trimming procedure is therefore afforded by a structure which can be driven out to the cattle on the range and used safely by the cattleman himself, without requiring the services of a specialist. The hoof trimming procedure is thus rendered considerably more economical and easier than heretofore.

The invention in general is a cattle vise comprising a frame having width at least sufficient to accommodate an animal, having an open bottom, and lower edge adapted for stable positioning on the ground, and a pair of side panels facing within the frame for clamping the animal therebetween. Each panel has a lower section inclined with its lower edge inwardly of the frame and an upper section, which abuts the lower section inclined to form a wide obtuse angle with the lower section, facing inwardly of the frame. Means is provided for guiding one of the panels for relative horizontal movement with respect to the other panel. The structure also includes means located behind, and for moving the lower section of the one panel horizontally toward the lower section of the other with the animal disposed therebetween so as to exert both squeezing and lifting force to the animal, and independent means is included behind and linked to the upper section for moving the upper section of the one panel toward the upper section of the other panel to complete the clamping of the animal.

As the lower section of the one panel moves toward the other, the inclined surfaces cause lifting force against the underside of the animal, thus relieving a portion of the weight from its legs, and thus facilitating later rotation of the animal into a generally horizontal position without injuring its legs.

A better understanding of the invention will be obtained by reference to the detailed description below, and to the following drawings, in which.

Figure 1:
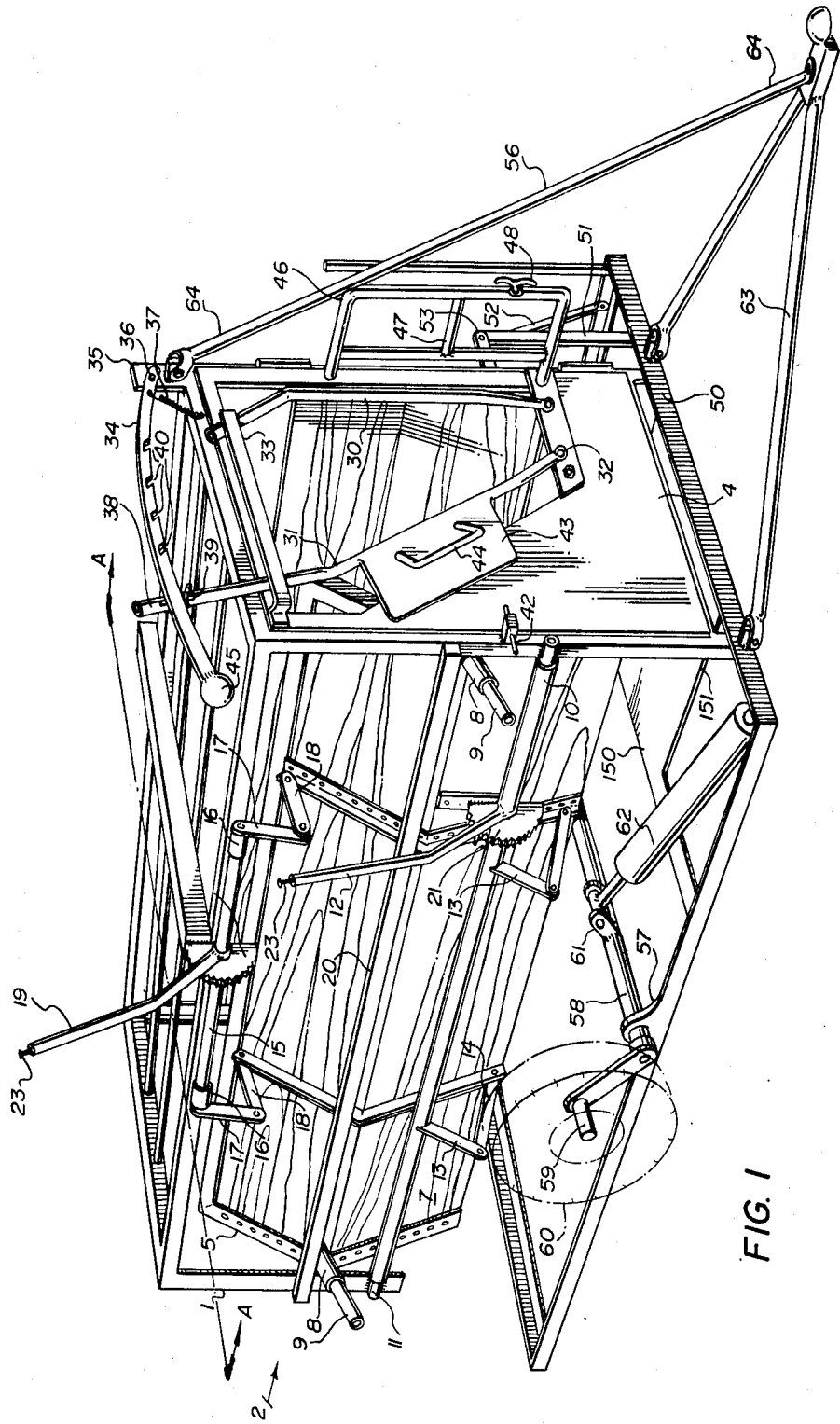
FIG. 1 is detailed perspective view of the invention.

Turning first to FIG. 1, the invention is comprised of a generally box type frame 1 preferably constructed of welded angle iron. The rear 2 of the frame is unobstructed to accommodate the entry of an animal, while the lower portion of the front 3 of the frame is closed by a hinged door 4, which is locked by a spring loaded locking pin 42. The frame should of course be wide enough and tall enough to accommodate an animal.

The lower edge of the rectangular box type front and rear of the frame is adapted for stable positioning on the ground. However, it has been found that it is sometimes desirable to delete the bottom of the rear of the frame, as shown in FIG. 1, to provide more room for an operator. In this case the frame is supported by means to be described below. Alternatively the deleted portion can be used during transport and removed or swung to a position to form a rear crossmember during the trimming operation. This will be described in more detail with reference to FIG. 6.

Further, the lower edge of the front of the frame is preferably raised as shown, to allow more room for an operator during the hoof trimming operation.

An animal such as a bull is driven through the unobstructed rear of the frame toward the front, and further passage is stopped by the door 4. There is no ramp to climb and consequently animals have been found to remain unfearful and relatively docile due to the fact that their hoofs remain on the familiar earth until their neck is clamped and they stand on the foot plate.

Figure 2:
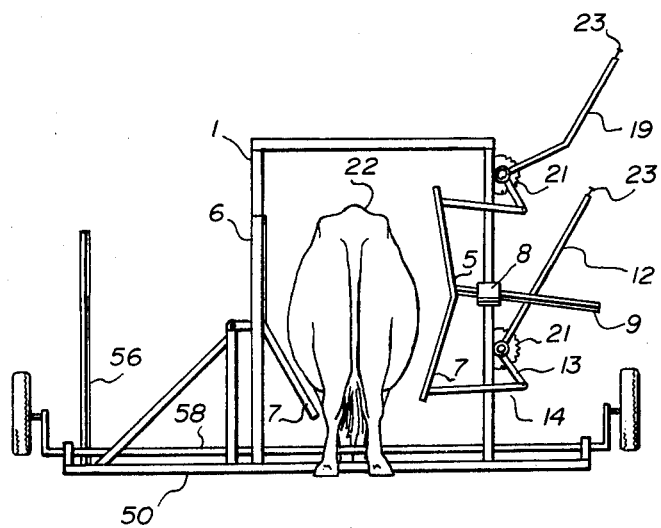
FIGS. 2, 3, 4 and 5 show in rear elevation section, the invention in various stages of clamping an animal and raising it to an operative position.

As will be noted with reference to FIG. 2, the structure is comprised of a pair of side panels 5 and 6, which face each other within the frame, for clamping the animal between them. Each panel has a lower section 7 which is inclined inwardly of the frame as shown. An abutting upper section is also inclined toward the top to form a wide obtuse angle facing inwardly of the frame. Preferably the panels are comprised of a frame within which are held horizontal planks, spaced for ease of cleaning, each of about 2 inches thickness. Typical dimensions of the frame are preferred to be 3 feet wide, 68 inches high and 9 feet long.

The invention also includes guide means for guiding one of the panels for relative horizontal movement with respect to the other panel. Preferably the guide means is comprised of short cylindrical sections 8 attached with their axes parallel and horizontal to opposite ends of the frame at the side adjacent the moving panel. Cylindrical posts 9 extend through the cylindrical guide sections 8 and are fixed rigidly to the outside of moveable panel 5. Preferably the posts 9 have a loose tolerance fit within cylindrical sections 8 in order that panel 5 will have some upward and downward play, in addition to movement inwardly and outwardly along the axes of cylindrical sections 8. It it preferable to fix panel 6 with its upper section vertical along its side of the frame.

Means is provided behind the lower section 7 of panel 5 for moving the former horizontally toward the lower section of the other panel with the animal disposed between the panels, so as to exert both squeezing, and due to the inclination of the lower panels, lifting force to the animal. Independent means behind the upper section is provided for moving the upper section of the panel toward the upper section of the other panel, to complete the clamping of the animal.

While hydraulic cylinders can be used for the panel moving function, it is preferred to use a lever operated arm mechanism to effect the above, in order that there be some "feel" or feedback as to the degree of pressure being exerted on the animal, back to the operator. The structure is comprised of a pipe 10 rotatably supported at its ends by the bushings 11 welded to the frame, which hold the ends of the pipe from lateral movement while allowing rotational movement. The pipe also provides lateral support for the rear of the frame 2 which does not extend to the ground as does the front of the frame.

Extending outwardly from the pipe 10 is a lever 12, which is fixed to the pipe. Also extending outwardly from the pipe at a different angel than the lever are spaced arms 13. Links 14 are pinned to the ends of arms 13, as well as to spaced positions near or at the bottom of the lower section 7 of panel 5.

At the top of the frame on the same side is a second pipe 15, which is rotatably held within bushings 16. Second pipe 15 need not extend the length of the frame as pipe 10, since its only function is to transfer movement of a lever 19 to links attached to the panel. Accordingly at the ends of second pipe 15 fixed arms 7 are fixed, the ends of which are pinned to links 18 in a similar manner as arms 13 are pinned to links 14.

Also centrally located and extending outwardly from pipe 15 is lever 19.

A length of angle iron 20 extends between the ends of frame 1, to provide support for the end of the frame 2 which is unsupported on the ground. Ratchets 21 are fixed to the frame (as by welding) and are located next to levers 12 and 19 with their axes coaxial with pipes 10 and 15. A spring loaded pin of conventional construction (not shown) internal to or guided by lever 12 and 19 engages the teeth of each of ratchets 21 for securely holding the levers in position as they are moved and rotate pipes 11 and 15.

Figure 3:
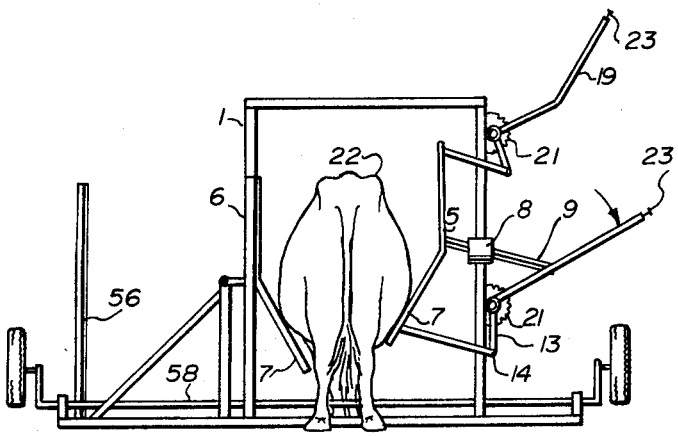
Figure 4:
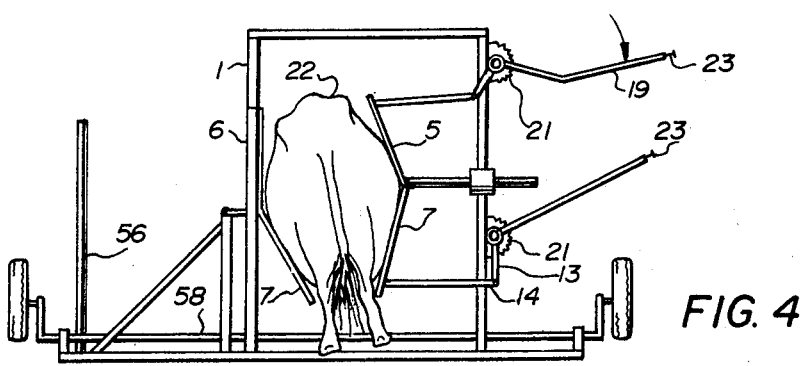

Turning now to FIGS. 2, 3 and 4 in conjunction with FIG. 1, an animal 22 such as a bull or cow is driven into the open rear of the frame. FIG. 2 shows the animal located within the structure. Means which will be described later utilized to clamp its neck loosely in order to trap it into position is then opened, enticing the animal forward, then clamped around its neck. A bar (not shown) hinged to one side of the rear of the frame is then latched across the rear of the frame to safeguard against the animal backing out when not desired.

Side panel 5 is then pushed toward the side of the animal until contact is made. Posts 9 slide within bushings 8, allowing movement of the side panel while supporting it. Lower lever 12, is then rotated downwardly, causing arm 13 and link 14 to rotate, effectively pushing the bottom of panel 5 against the lower body portion of animal 22, facilitated by some play in the tolerance of fit between the posts 9 and the bushings 8. A mechanical advantage is obtained while the lower panel section is pushed against the animal due to the ratio of the length of arm 13 to that of lever 12. As shown in FIG. 3, the lower section 7 of panel 5 has been driven against the animal, causing the animal to be forced against the lower section 7 of panel 6. Clearly not only is there a clamping action, but significant lifting force against the body of the animal due to the lower sections of the panels acting as ramps. A substantial amount of weight is thereby removed from its feet.

The upper lever 19 is then rotated, moving the upper section of panel 5 against the animal, effectively pushing it further into the angled portion of panel 6, thereby clamping the animal as in a vise, but with significatn release of weight from the legs of the animal.

It should be noted that due to the form of the mechanism, both lifting and clamping of the animal is obtained, while significant "feel" of the pressure is afforded the operator. Yet the lifting mechanism does not obstruct either the top or bottom of the frame, facilitating access to the feet of the animal.

With this form of squeezing action, pressure is exerted against large areas of the body of the torso of the animal, for example along the stomach, above or below the knees, the hips, etc., as distinguished from the narrow bonds of pressure exerted by the straps of the belly strap method. Due to the broad access to pressure the animal feels fully trapped and tends to "give up" struggling, which clearly provides increased safety to the operator.

When first the lower, and then upper levers are swung into their clamping positions, the respective pins referred to earlier extending from levers 12 and 19 engage the teeth of ratchets 21 locking the levers into clamped position. When the ratchets are to be released, the pins are released by means of spring loaded extensions 23, which are linked to the pins. While in the figures the extensions have been shown centrally of, and past the ends of levers 12 and 19, they can be located at any convenient location.

Referring back to FIG. 1, the door 4 contains a cutout which accommodates a neck clamp. The neck clamp is comprised of a right clamping member 30 which has a generally vertical section inward of the side of the door and an upper and lower section bent inwardly and welded or otherwise fastened to the bottom and top of the door surrounding the cutout.

A left clamping member 31, of generally similar shape as the right clamping member is disposed opposite and facing the right clamping member. However, the left clamping member is rotatably fastened at its bottom by means of a pin 32 which may be held by means of a nut or other means. Left clamping member 31 is thus free to swing toward or away from the right clamping member.

A guide member 33, preferably native angle iron is welded or otherwise fastened from the top of right clamping member 30 across to the opposite edge of the door. The guide, spaced from the upper edge of the door and enclosing left clamping member 31, provides a track within which left clamping member 31 must follow.

A curved locking arm 34 is pinned to door post 35 by pin 36 in such manner that it can swing about the pin. While the locking arm is held downward by gravity, it is preferred to provide further downward pressure by means of spring 37 which is clipped between the locking arm and the door.

An extension 38 to the left clamping member 31 rises past locking arm 34. A spring loaded pin 39 biased upwardly, extends under and against locking arm 34 from a slot in entension 38. A plurality of notches 40 extending into the bottom of locking arms 34 in a direction outwardly from doorpost 35 provides means for retaining the spring loaded pin 39 when the left clamping member is swung into various positions close to right clamping member 30.

A baffle 43 extends in a direction oppositely to right clamping member 30 to cover to a substantial extent a gap which would otherwise be present between left clamping member 31 and the door, in order to substantially block what would appear to be an alternate exit to small animals. A handle 44 extends forwardly from left clamping member 31 for use by an operator in moving left clamping member 31. In addition a handhold 45 at the end of locking arm 34 provides a means for raising locking arm 34 in order to disengage pin 39 from notches 40.

In operation, the left clamping member is rotated by an operator exerting pressure on handle 44 to a position adjacent right clamping member 30. Baffle 43 extends to the left thereof to substantially block the appearance of the space between the left clamping member and the door as being an exit. Pin 39 is thus held within one of the notches 40 by means of pressure exerted by its own spring loading and the spring 37 coacting with locking arm 34.

The animal is driven into the frame and a locking bar is latched into position across the frame behind it, baring rear exit.

The operator then exerts upward pressure on handhold 45, which locking arm 34. This releases spring loaded pin 39, allowing the left clamping member to be rotated counterclockwise. Aid may be given by the operator exerting pressure on handle 44.

From inside the frame it appears that an exit has opened for the animal. The animal lunges forward, extending its neck between the right and left clamping members 30 and 31. However its legs are stopped by the solid portion of door 4. At the same time, with its neck extended forward, its front hoofs are in postion standing on foot plate 151.

The operator then pushes handle 44 to rotate left clamping member 31 counterclockwise against the neck of the animal. Since the right clamping member is disposed close to door post 35, the neck of the animal is slightly toward that side. Pin 39 engages one of the notches 40, depending on the width of the animals neck. The animal is thus clamped in position.

It should be noted that due to the elongated oppositely disposed generally vertical sections of the right and left clamping members, a wide variety of animals having different neck heights can accommodated without injury. Further, the present structure is preferred since the animal is not clamped at the top and bottom if its neck, thus reducing the possibility of injury by blocking its windpipe due to excess vertical pressure.

It should also be noted that due to the slanted form of notches 40, sideways pressure exerted on left clamping member 31 by the animal simply causes pin 39 to be more firmly seated within its corresponding notch 40.

To release the animal the operator exerts upward pressure on handhold 45, lifting locking arm 40 and releasing pin 39 from its corresponding notch 40. The left clamping member 31, under pressure from the animal, moves counterclockwise, releasing its neck. Locking pin 42 is pulled, allowing door 4 to swing open, allowing the animal to exit without injury at ground level. Locking arm 34, being pinned to door post 35 swings around with the door in the event that door post 35 be part of the door, hinged to the frame. However in the event that it is preferred that door post 35 be fixed to the frame at the door hinged thereon, it is necessary to raise locking arm 34 above the top of extension 38 of left clamping member 31, to allow left clamping member 31 to swing around with the door. When the door is closed, locking arm 34 is again raised to clear the top of the extension of left clamping member 31 and is then lowered to normal operating position.

The inventive structure also is comprised of a novel headrest for the animal. The headrest 46 is formed of tubing and is maximally gapped to accommodate the horns of an animal which would rest its head thereon when the structure is rotated. The headrest is comprised of a rectangular frame having crossmember 47 with spaces between crossmember 47 and the top and bottom thereof to accommodate the aforenoted horns. A tiedown 48 is fixed to the headrest to allow typing of the head to the headrest with a rope or leather halter to aid in restraining the animal if need be, or to aid in dehorning, if required. A pair of setscrews fasten the headrest in position in a conventional manner.

The headrest is disposed at angle, nearly vertical, in order that its plane be approximately horizontal in the normal working position when the frame is rotated. As a result the head of the animal rests on an approximately horizontal plane.

The inventive structure is also comprised of a base 50, which is preferrably rectangular in shape and is fabricated of angle iron. The length of the base is slightly greater than the length of the frame, in order that the bottom of the frame, where it would otherwise contact the ground should rest on the lower lip of the angle iron. However the width of the base is significantly wider than the base for stability. The bottom of the angle iron itself rests on the ground in the operative position.

A crossmember 150 extends between the lower side members of the base near the front of the frame, preferably in contact with the earth floor when in clamping postion. A foot plate 151, also preferably in contact with the earth floor when the frame is in its clamping position, extends between the crossmember 150 and the lower front member of the base. The size and location of the foot plate is just sufficient to cause the front hoofs of the animal to rest upon it when its neck is forward and clamped.

At one side and at both ends of the frame spaced laterally a small distance therefrom (typically two inches) are vertical posts 51. The bottom of posts 51 are secured to the frame, and they are further secured by a strut or struts 52.

The top of each post is pinned to a horizontal link 53 which has its other end secured, as by welding, to the frame. In the form of the invention in which the bottom portion of the frame at the rear is not provided to support the rear of the frame, the adjacent post 51 via link 53 performs the support function.

In addition, the rear closing member described earlier, when closed and fastened, provides means for transferring the animal clamping force from one side of the frame to the other, which force would otherwise tend to exert splitting force to the frame.

Figure 6:
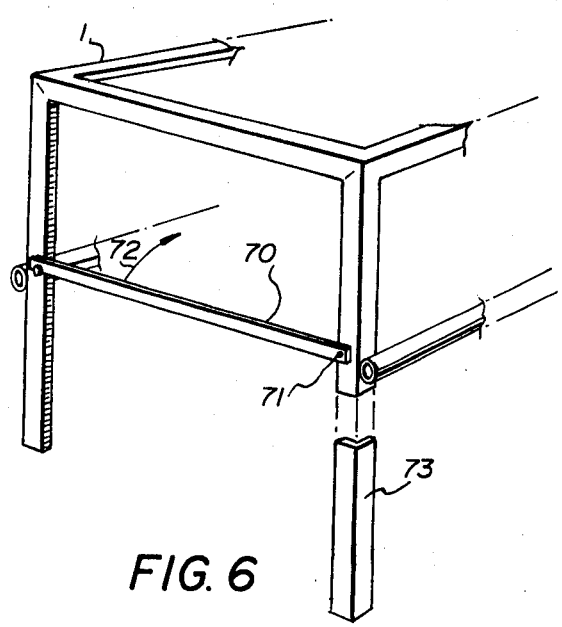
FIG. 6 is a perspective of a detail of the rear of the frame, partly exploded.

FIG. 6 shows a detail of the rear of the frame 1, excluding details of the interior, the base, etc.. A rear closing member 70 is rotatably held by pin 71 to 1 of the side members of the frame. Arrow 72 depicts a direction in which the rear closing member 70 can be rotated to open the rear of the frame and thus allow an animal to enter. Once the animal has gone into the enclosure, rear closing member 70 is rotated to a pin or latch (not shown) which retains its unpinned end in position, even against backward pressure from the animal.

It is preferred that the bottom of the frame at the rear be deleted, as shown. This allows increased room for the hoof trimming operation by the operator. Further, it is preferred that the lower portion 73 of a vertical member at the rear of the frame be removable, in order that during the tilted hoof trimming operation, there be even more increased room to accomodate an operator. The lower portion 73 can be held to the main frame by means of wing nuts or the like for stability during transport of the apparatus.

Figure 5:
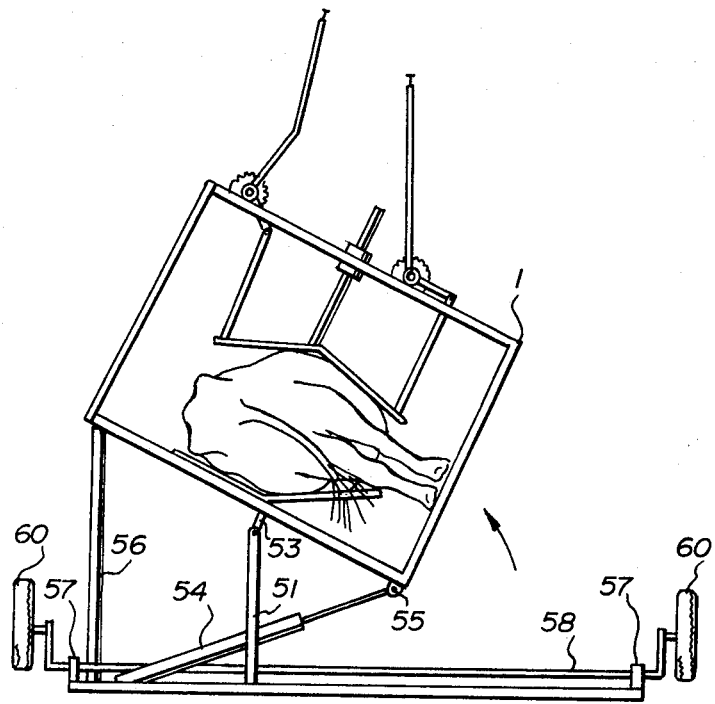

As shown in FIG. 5, a hydraulic cylinder 54 abuts the side of the base which is adjacent posts 51, and extends and is linked to the bottom of the frame at a hinge point 55, which is at a central location relative to the two ends of the frame. In operation, once the animal has been clamped as described with reference to FIGS. 2, 3 and 4, pressure is applied to hydraulic cylinder 54, causing it to expand, and thus push and rotate the entire frame around the top of posts 51.

A pair of vertical posts 56, one adjacent each corner of the base 50 provides a rest against which frame 1 is forced when the frame is rotated by the extension of hydraulic cylinder 54.

It should be noted that due to the presence of link 53, the first movement of the frame is upward rather than sideways as the frame rotates. Since a considerable amount of weight had been relieved from the animal's legs, there is little compression of its legs to relieve and hence little resistance to any initial sideways motion, and there is as a result little loss of equilibrium imparted to the animal and little likelihood of damage. The animal's head naturally comes to rest on the headrest, relieving any strain on its neck which would otherwise occur. Accordingly due to this structure including broad areas of body contact by the side panels, a maximum of docility and animal comfort is maintained, and the animal is easily operated upon.

As will be noted in FIG. 5 the animal is rotated with its hoofs extending generally horizontally, which makes them highly accessable to the operator. The hoofs may be thus be trimmed, after which the hydraulic cylinder pressure is released, and the frame is rotated back and restored to its original position. The neck clamp is released as described earlier, the door is opened, and the animal is allowed to exit the frame at ground level.

The base also contains laterally spaced bushings 57 which rotatably hold a jackshaft 58. The ends of the jackshaft 58 extend into spindles 59, to which wheels 60 are attached (shown in phantom in FIG. 1).

An arm 61 extends upwardly from jack axle 58 (see FIG. 1), and a hydraulic cylinder 62 is linked to the end of arm 61 as well as to the front (or rear if desirable) of the base 50.

When the structure is utilized as described above, the jackshaft 58 is in the position shown, with the base 50 resting upon the ground in a stable position. When the frame 1 is rotated to expose the underside of the animal, the center of gravity is within the frame periphery, maintaining its stability.

However, when it is desired to transport the structure, the pressure is applied to hydraulic cylinder 62 which causes rotation of jackshaft 58. Wheels 60 then touch the ground, and with further rotation of the jackshaft, raise the underside of the base 50 from the ground. The jackshaft can then be locked into position by the insertion of pins between the jackshaft and the base, by locking hydraulic cylinder 62 in its extended position, or by the use of one or more anchor chains holding the jackshaft in position.

A draw bar 63 is attached to the front of the base 50. A removable arm 64 extends the front of the draw bar 63 to the top of the frame for stability when the entire structure is pulled by a vehicle. Arm 64 has a removable link to the top of the frame; preferably the entire draw bar is likewise removable.

It should be noted that there need to be two hydraulic cylinders used with the apparatus, since the same one can be used both for rotation of the jackshaft and rotation of the frame. In this case the ends of the hydraulic cylinder are fastened by removable pins, and the same cylinder used for both purposes.

The present invention is clearly an improvement in animal retention apparatus for hoof trimming. The structure facilitates the operator sensing the degree of pressure exerted on the animal. Further, a significant portion of the weight of the animal is removed from its feet prior to lifting, which minizes the likelihood of any damage which might occur during the rotational lifting process.

It is important that the entire bottom of the frame is open, giving completely clear access to the rancher for operating on the animal's hoofs. Yet the apparatus is portable, easily transported, and is highly stable during use. The animal is rendered relatively docile due to comfort afforded by the offset neck rest, and head rest, the large areas of contact of the holding panels and accommodation for any protruding horns. As a result substantial economies and ease of operating on the animal, safety, and speed of accessing is for the first time given the rancher.

A person skilled in the art reading this specification and understanding the invention may now conceive of other variations or embodiments. There are considered to be within the scope of the present invention, as defined in the appended claims.

The embodiments of the invention in which an exclusive property or privilege is claimed are defined as follows:

1. A cattle vise comprising a frame having width at least sufficient to accommodate an animal, having an open bottom, and a lower edge adapted for stable positioning on the ground, a pair of side panels facing each other within the frame for clamping the animal therebetween, each panel having a lower section inclined with its lower edge inwardly of the frame and an upper section abutting the lower section and forming a wide obtuse angle with the lower section facing inwardly of the frame, means for supporting said side panels in the frame, said supporting means including means for guiding one of the panels for relative horizontal movement with respect to the other of the panels, means behind and linked to the lower section of said one panel for moving said lower section horizontally toward the lower section of the other panel with said animal disposed therebetween so as to exert both squeezing and lifting force to said animal, independent means behind and linked to the upper section for moving the upper section of said one panel toward the upper section of the other panel to complete the clamping of said animal, and means for supporting said moving means relative to the frame.

2. A cattle vise as defined in claim 1, in which said means for moving is comprised of individual lever operated arms having links from the end of each of the arms connected to the upper and lower sections of said one panel, each lever co-operating with a ratchet means fixed to said frame and engaged by pins associated with the levers for locking the levers in a clamping position.

3. A cattle vise as defined in claim 2, further comprising a neck clamp at the front of the frame, the neck clamp comprising a pair of clamping members having a generally vertical slot therebetween for accommodating the neck of an animal, means for retaining one of the clamping members at a variable spacing from the other clamping member to accommodate various thicknesses of the necks of various animals, and means for releasing said one of the clamping members whereby the claimp can be completely opened to release the neck of an animal.

4. A cattle vise as defined in claim 1, 2 or 3 in which the other of said panels is fixed to the frame with its upper section vertical.

5. A cattle vise as defined in claim 3 in which said one of the clamping members is pinned at its bottom adjacent the bottom of the other clamping member to allow movement toward or away from the other clamping member, and a locking bar means disposed across and above the front of the frame for latching said one clamping member into a desired position relative to the other clamping member.

6. A cattle vise as defined in claim 3 in which the other of said panels is fixed to the frame with its upper section vertical, the generally vertical slot being located off-center of the frame and closer to an adjacent side of the frame to which said other of said panels is fixed than to the other frame side and further comprising a rectangular base having extensions sideways of the frame surrounding the bottom of the frame, a pair of pivot posts extending vertically outside, parallel to, but spaced from said adjacent side of the frame at opposite ends of the frame, the pivot posts being rigidly fixed at their bottoms to said base, a link hinged at one end to the top of each pivot post extending and rigidly fixed at its other end to the frame, and means for swinging the entire frame about the top of said pivot posts so as to render the open bottom of the frame accessable from the side.

7. A cattle vise as defined in claim 6 further including a headrest fixed to the front of the frame extending forwardly and beside the neck clamp in a plane approximately horizontal when the frame is in its tilted position.

8. A cattle vise as defined in claim 6 in which the means for swinging is comprised of a hydraulic cylinder linked at a central location between the lower portion of said adjacent side of the frame and said base, and is adapted to push the bottom of said frame sideways, tilting it about the top of said pivot posts.

9. A cattle vise as defined in claim 8 further including a headrest formed of a frame containing large open gaps within the frame for accommodating the horns of an animal, the headrest being fixed to the front of the frame and extending forwardly and below the neck rest in an approximately horizontal plane when the frame is in its tilted position.

10. A cattle vise as defined in claim 8, further including a door closing the front of the frame and hinged along one side to the edge of the frame, means within the door forming the neck clamp, a moveable restaining bar for closing the rear of the frame against the backing out of an animal within the frame, a jackshaft extending across and held by the base, a pair of wheels rotatably fixed to spindles at the ends of the jackshaft outside of the base, and means for linking a hydraulic cylinder to a lever extending orthogonal to the jackshaft and to the base for rotating the jackshaft and the spindles, rotating the wheels below the bottom of the base and applying them against the ground, causing the base to be raised from the ground and allowing the entire cattle vise to roll by said wheels; and a draw bar attached to one end of the base to facilitate lifting one end of the base and pulling the cattle vise as a trailer.

11. A cattle vise as defined in claim 3, 6 or 9 further comprising a jackshaft extending across and held by the base, a pair of wheels rotatably fixed to spindles at the ends of the jackshaft, and means for rotating the jackshaft and the spindles, thus locating the wheels below the bottom of the base and applying them against the ground, causing the base to be raised from the ground and allowing the entire cattle vise to roll by said wheels; and a draw bar attached to one end of the base to facilitate lifting one end of the base and pulling the cattle vise as a trailer.

* * * * *